March 6, 1962 S. S. GROVER ET AL 3,023,842
ACETYLENE PURIFICATION
Filed Aug. 5, 1958
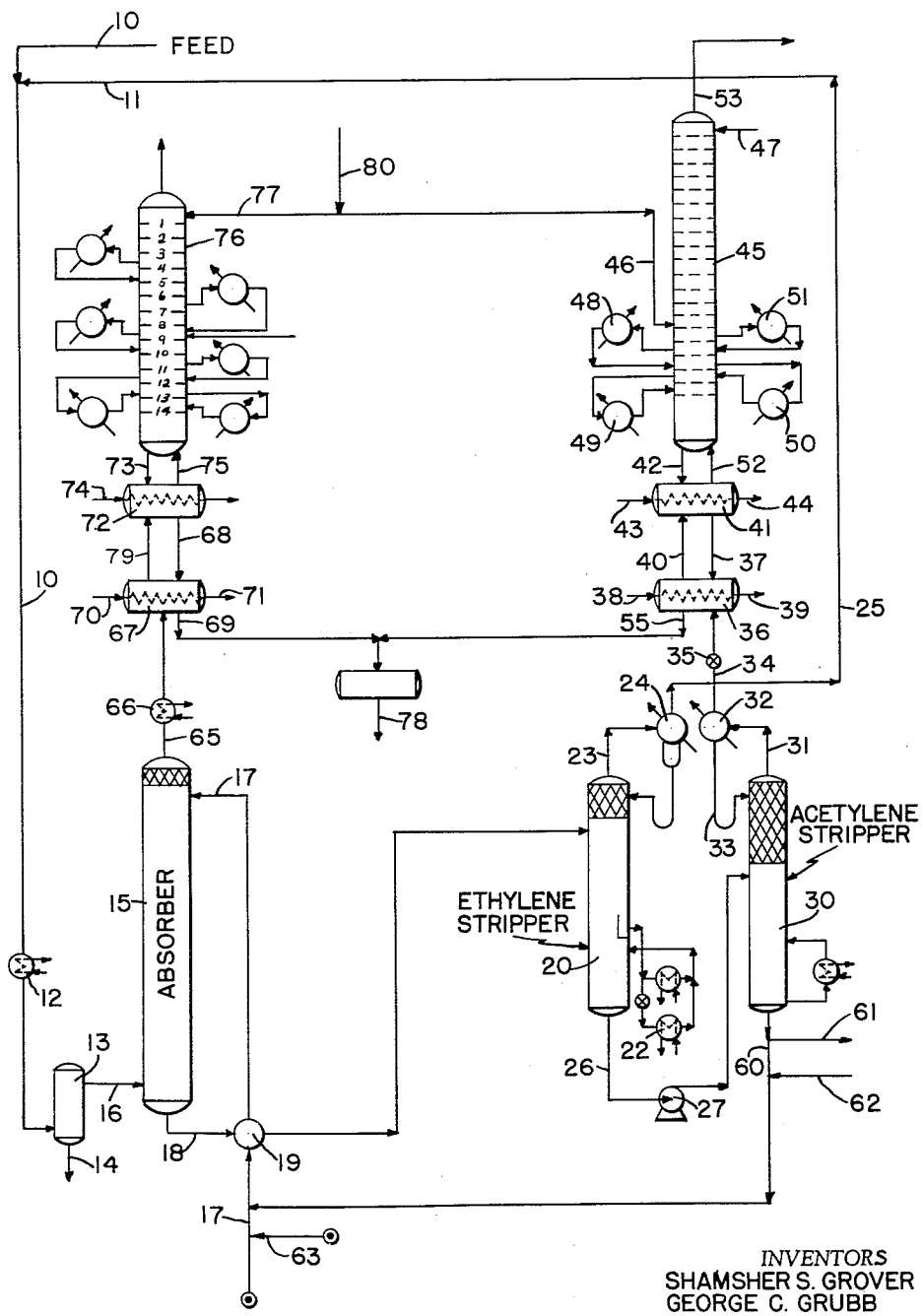
INVENTORS
SHAMSHER S. GROVER
GEORGE C. GRUBB
WARREN W. WALK
BY
G. H. Palmer
John C. Trimber
ATTORNEYS

United States Patent Office 3,023,842
Patented Mar. 6, 1962

3,023,842
ACETYLENE PURIFICATION
Shamsher S. Grover, Elmhurst, N.Y., George Craig Grubb, New Shrewsbury, N.J., and Warren W. Walk, Irvington, N.Y., assignors to The M. W. Kellogg Company, Jersey City, N.J., a corporation of Delaware
Filed Aug. 5, 1958, Ser. No. 753,346
8 Claims. (Cl. 183—115)

The present invention relates to an improved method for separating acetylene from a gaseous mixture containing acetylene and other gases such as hydrogen and carbon monoxide. In another of its aspects this invention relates to the preparation of substantially pure acetylene.

A number of processes for the separation of acetylene from gas mixtures are available. Generally, these processes involve the selective absorption of acetylene in a suitable absorbent. The acetylene rich absorbent is then separated from the unabsorbed gases after which the acetylene is recovered. A number of absorbents have been proposed for this separation, the most efficient being liquid ammonia. Liquid ammonia, in addition to its high selectivity for acetylene, has the advantage that it is used at relatively low temperatures which are preferred for handling acetylene and, also, is auto refrigerating. However, since the acetylene containing gas must be cooled prior to treatment in the absorption zone, some difficulty is experienced in using liquid ammonia due to the freezing of water which is usually present in the gas mixture. The freezing of water contained in the gas mixture causes plugging of heat exchangers etc., necessitating shut-down.

It is an object of this invention to provide an improved process for separating acetylene from a gas mixture.

It is another object of this invention to recover acetylene from a gas mixture containing acetylene and other normally gaseous hydrocarbons, carbon oxides and hydrogen.

It is another object of this invention to provide an improved process for selectively absorbing acetylene in liquid ammonia.

It is another of the objects of this invention to prepare substantially pure acetylene.

Various other objects and advantages of the invention will become apparent from the following detailed description and discussion.

According to the present invention, a gas mixture containing acetylene is admixed with ammonia vapor, cooled to a temperature between about 32° F. and —60° F. and introduced into an absorption zone containing liquid ammonia and maintained at a temperature between about —95° F. and about 0° F. Admixing ammonia vapor with the acetylene containing gas prior to the cooling operation eliminates freezing and prevents clogging of the refrigeration equipment. In a preferred method of operation, the ammonia vapor is a recycle stream obtained in subsequent stripping operations, more fully described below.

The principal commercial process for the preparation of acetylene involves the pyrolysis of low boiling petroleum fractions, i.e., light hydrocarbons ranging from normally gaseous hydrocarbons through light naphthas. In these processes, the hydrocarbon feed is maintained under closely controlled conditions of temperature, pressure and reaction time to provide a gas mixture containing a recoverable quantity of acetylene. As indicated, the process is applicable to the conversion of normally gaseous hydrocarbons as well as normally liquid hydrocarbons. In the conversion of normally gaseous hydrocarbons the feed material, preferably preheated, is combined with a quantity of oxygen, in an amount sufficient to oxidize a portion of the hydrocarbon feed. This oxidation reaction supplies the bulk of the heat necessary for the conversion of the hydrocarbons to desired products. For the conversion of liquid hydrocarbons to acetylene, a suitable combustion gas, such as hydrogen, mixtures of hydrogen with carbon oxides, and normally gaseous hydrocarbons is burned with oxygen under conditions conducive to complete oxidation of the combustion gas. The liquid hydrocarbon feed, preferably preheated, is injected into the hot combustion gases. Preheating of the liquid hydrocarbon feed should be kept substantially below reaction temperatures in order to avoid premature reaction.

The pyrolytic conversion of hydrocarbons is an endothermic reaction and the distribution of the pyrolysis reaction products is determined to a significant extent by the reaction temperature and the reaction time in addition to the composition of the feed. Pressure also influences product distribution. As a general rule, high temperatures combined with short reaction times favor the production of acetylene whereas lower temperatures and longer reaction times favor the production of ethylene. Conditions most favorable for the production of acetylene involve reaction temperatures between about 1,500° F. and about 3,000° F. with reaction times between about .001 and .01 second.

In carrying out the process of this invention, the crude acetylene containing gas, produced by the pyrolysis of a hydrocarbon, is preferably first treated to remove carbon, tar and most of the carbon dioxide which are formed during the reaction. The acetylene containing gas is preferably subjected to additional treatment to remove heavy hydrocarbons including acetylene homologues.

As a result of the preliminary treatment of the pyrolysis gas, a gas rich in acetylene, hydrogen, carbon monoxide and normally gaseous hydrocarbons, such as methane and ethane, is obtained. Where a liquid hydrocarbon is pyrolized, the gas contains recoverable quantities of ethylene. Acetylene is separated from this gas mixture by absorption in liquid anhydrous ammonia. In this connection, the acetylene containing gas is introduced into an absorption column where it is contacted with the ammonia. The absorption column is operated at a temperature between about —95° F. and about 0° F. and preferably between about —50° F. and about —30° F. and a pressure between about 20 p.s.i.a. and about 180 p.s.i.a. The acetylene containing gas, is of course, cooled to about the temperature prevailing in the absorption column and preferably between about 10° F. and about 30° F. above absorption column temperature in order to maintain auto refrigeration conditions. To prevent freezing, ammonia vapor is admixed with the acetylene containing gas in an amount between about .01 and about .06 mol per mol of gas before cooling. The concentration of ammonia vapor is an important factor since less than about .01 mol per mol of gas will not efficiently prevent freezing while more than .06 mol per mol of gas precludes the efficient maintenance of auto refrigeration conditions in the column. Auto refrigeration conditions prevail due to the vaporization of the ammonia which cools the column.

In the absorption column, acetylene is preferentially absorbed together with a minor amount of other pyrolysis gases (including ethylene where a liquid hydrocarbon is pyrolyzed), in the liquid ammonia. Unabsorbed gases are withdrawn from the absorption column, treated to recover ammonia vapor and discharged from the system. The enriched ammonia absorbent is withdrawn from the absorption zone, and introduced into a stripping zone maintained at a temperature between about 40° F. and 100° F. and a pressure between about 100 p.s.i.a. and about 310 p.s.i.a. from which a gas stream containing substantially all absorbed non-acetylenic pyrolysis gases, such as hydrogen and carbon monoxide together with a small amount of acetylene is removed. This gas stream contains a large amount of ammonia. Hence, in the preferred operation of the process of this invention, this gas stream is recycled and combined with the acetylene containing feed gas. Recycling of this stream increases the overall efficiency of the process since the acetylene contained therein is recovered.

Ammonia absorbent containing acetylene and substantially free of other gases is withdrawn from the first stripping zone and introduced into the second stripping zone to recover the absorbed acetylene. This second zone is maintained at a temperature between about 40° F. and about 120° F. and a pressure between about 80 p.s.i.a. and about 310 p.s.i.a. Under these conditions substantially all of the acetylene, together with some ammonia vapor, is removed from the second stripping zone and contacted with water in an ammonia absorption zone to dissolve the ammonia vapor. Substantially pure acetylene is withdrawn from the ammonia absorption zone, dried and recovered as product.

Lean ammonia is withdrawn from the second stripping zone and recycled to the absorption zone. To prevent the build-up of heavy impurities in the ammonia recycle stream, between about 10 and about 30 percent of the lean ammonia absorbent is withdrawn from the recycle stream and treated preferably in a first fractionation zone maintained at a temperature between about 70° F. and about 110° F. and a pressure between about 130 p.s.i.a. and about 220 p.s.i.a. Purified anhydrous ammonia is removed overhead from the fractionation zone and recycled to the absorption zone. Ammonia containing heavy boiling material is withdrawn from the bottom of the fractionation zone diluted with water and purged from the system.

As indicated previously, the unabsorbed gases from the absorption zone and the acetylene stream from the second stripping zone each contain considerable quantities of ammonia vapor. These gas streams are, therefore, separately treated in similar ammonia absorption zones where the ammonia vapor is absorbed in water. Water from these two zones, which contains dissolved ammonia, is combined and treated to recover dissolved ammonia preferably in a second fractionation zone. This second fractionation zone operates at a temperature between about 70° F. and about 110° F. and a pressure between about 130 p.s.i.a. and about 220 p.s.i.a. Anhydrous ammonia is removed overhead from this second fractionation zone and is recycled to the absorption zone. Water is removed from the bottom of the fractionation zone and is recycled to the ammonia absorption zone. Because the absorption of ammonia in water is accompanied by the evolution of a large amount of heat, due to the high heat of solution of ammonia, each of the ammonia absorption zones are operated in several stages. Thus, the ammonia containing gas is introduced initially into at least one liquid phase absorption stage and then into a dispersed phase absorption stage. In the liquid phase absorption stage the amomnia containing gas is contacted with water which absorbs a portion of the ammonia vapor. The heat evolved by the absorption is removed by indirect heat exchange means positioned within the liquid phase absorption stage. After treatment in the liquid phase absorption stage of the ammonia absorption zone, the gas, containing a reduced quantity of ammonia, is passed to the dispersed phase absorption stage. Dispersion of water in the dispersed phase absorption zone is obtained by any convenient means, such as sprayers or bubble trays. Preferably bubble trays are employed. Because heat is evolved in the dispersed phase absorption stage, suitable external cooling means are provided to remove heat. Flow through the ammonia absorption zone is countercurrent. Thus, the water absorbent is introduced at the top of the dispersed phase absorption tower and flows countercurrent to the gas stream. Water from the bottom of the dispersed phase absorption stage is introduced into the liquid phase absorption zone for countercurrent contact with ammonia containing gas. The absorbent water withdrawn from the liquid phase absorption zone, therefore, contains substantially all of the ammonia introduced into the ammonia absorption zone. The number of liquid phase stages depends on the quantity of gas being treated and the amount of ammonia contained therein.

Each of the ammonia absorption zones employs a recycle stream of water. In addition, the ammonia absorption zone which treats the acetylene containing gas employs a fresh water stream to facilitate complete removal of ammonia vapor from the gas stream. In this connection, the fresh water stream is introduced to the top of the dispersed phase absorption tower and the recycle water stream at a point intermediate the top and bottom of the tower.

As a specific illustration of the process of this invention, reference may be had to the accompanying drawing which is a digarammatic illustration of an acetylene purification unit. In the drawing, approximately 1,087 mols per hour of acetylene containing gas is introduced as feed through line 10 and combined wtih approximately 39 mols per hour of a recycle stream, described more fully below, flowing through line 11. The feed gas is obtained by the pryolysis of a light naphtha fraction which is subjected to preliminary treatment to remove carbon, tar and heavy hydrocarbons. The mol composition of the feed stream dry basis and the recycle stream is given below in Table I. The feed stream introduced through line 10 contains 0.17 mol of water. ($C_2H_6^+$ includes $C_3$ and $C_4$ hydrocarbons.)

Table I

|  | Feed mols per hour | Recycle mols per hour |
| --- | --- | --- |
| $H_2$ | 378.1 |  |
| CO | 367.4 |  |
| $N_2$ | 12.0 |  |
| $CH_4$ | 109.8 |  |
| $CO_2$ | 0.12 |  |
| $C_2H_2$ | 82.58 | 6.8 |
| $C_2H_4$ | 129.13 | 4.2 |
| $C_2H_6^+$ | 8.67 | 0.03 |
| $NH_3$ |  | 28.05 |
|  | 1,087.8 | 39.08 |

The combined gas stream flowing through line 10 passes through heat exchanger 12 where its temperature is reduced to −30° F., to prevent excessive vaporization of ammonia in the absorber, by indirect heat exchange with overhead from absorber 15, by means not shown. The cooled gas stream enters knock-out drum 13 from which condensed material is withdrawn through line 14. The acetylene containing gas leaves knock-out drum 13 through line 16 and flows to the bottom of absorber 15 in which it is countercurrently contacted with anhydrous ammonia entering the top of absorber 15 through line 17 at the rate of 44,400 pounds per hour. Absorber 15 is operated at a bottom temperature of −50° F. and a pressure of 62 p.s.i.a. and a top temperature of −40° F. and a pressure of 58 p.s.i.a. Approximately 43,664 pounds per hour of ammonia absorbent enriched with acetylene and a small amount of other hydrocarbons, including ethylene, is withdrawn from the bottom of absorber 15 through line 18 and heated to a temperature of 90° F. by indirect heat exchange with ammonia absorbent in heat exchanger 19. The thus heated gas stream flows through line 18 to the top of stripper 20. Stripper 20 operates at a bottom temperature of 116° F. and a pressure of 304 p.s.i.a. and a top temperature of 112° F. and a pressure of 302 p.s.i.a. Heat is supplied to the bottom of stripper 20 by reboiler 22. Absorbed gases, including some acetylene, together with ammonia vapor are withdrawn from the top of stripper 20 through line 23 and cooled in cooler 24. A portion of the cooled overhead is returned to the top of stripper 20 as reflux. The remainder of the cooled overhead stream is withdrawn from cooler 24 through line 25 and recycled to line 11 where it is combined with feed material as previously discussed. Approximately 42,891 pounds per hour of enriched ammonia absorbent, stripped of non-acetylenic materials, is withdrawn from the bottom of stripper 20 through line 26 and pumped by pump 27 to stripper 30. Stripper 30 is operated at a bottom temperature of 120° F. and a pressure of 295 p.s.i.a. and a top temperature of 110° F. and a pressure of 291 p.s.i.a. An overhead stream containing acetylene and ammonia vapor is withdrawn from stripper 30 through line 31 and cooled in cooler 32. A portion of the overhead stream is recycled through line 33 to the top of stripper zone 30. The remainder of the overhead stream, approximately 273.74 mols per hour of acetylene and ammonia vapor, flows from cooler 32 through line 34 to the first stage of the ammonia absorption zone. The pressure of the gas stream flowing through line 34 is reduced to approximately 16 p.s.i.a. by pressure reducing valve 35 positioned in line 34 in order to eliminate the hazards involved in handling acetylene at elevated pressures. The gas enters the first liquid phase absorber 36 of the ammonia absorption zone where it is contacted with water introduced through line 37. Evolved heat is removed from the first stage by indirect contact with cooling liquid, in this case water, which enters through line 38 and leaves through line 39. The cooling liquid is circulated through coils positioned within absorber 36.

Water containing substantially all ammonia introduced through line 34 is removed from the liquid phase absorber through line 55. Acetylene containing a reduced quantity of ammonia is withdrawn from the absorber through line 40 and introduced into a second liquid phase absorber 41 in the ammonia absorption zone where it is contacted with water containing dissolved ammonia introduced through line 42. Evolved heat is removed by indirect contact with cooling liquid, i.e., water, introduced through line 43 and removed through line 44. Water containing dissolved ammonia is withdrawn from second stage absorber 41 through line 37. Acetylene gas containing a further reduced quantity of ammonia is introduced into dispersed phase absorber 45 from line 52 where it is initially contacted with about 9,369 pounds per hour of a recycle stream of water (containing a small amount of ammonia) introduced at a intermediate section in the tower through line 46 and with about 4,459 pounds per hour of fresh water at the top of the tower through line 47. Evolved heat is removed by inter-stage coolings 48, 49, 50 and 51 positioned at the bottom portion of scrubbing tower 45. Approximately 81.33 mols per hour of acetylene saturated with water are withdrawn from scrubber 45 through line 53. The acetylene is dried, by means not shown, yielding an acetylene product of 99.5 percent purity.

Stripped ammonia is withdrawn from the bottom of stripper 30 through line 60. To prevent the build-up of polymer in the ammonia absorbent, approximately 7,500 pounds per hour of ammonia is withdrawn from line 60 through line 61 and fractionally distilled, by means not shown, in a fractionating zone maintained at a bottoms temperature of 110 F. and a pressure of 220 p.s.i.a. and a top temperature of 102° F. and a pressure of 217 p.s.i.a. Approximately 7,387 pounds per hour of distilled anhydrous ammonia are recovered by fractional distillation and are returned to line 60 through line 62 where the distilled anhydrous ammonia is combined with approximately 29,983 pounds per hour of untreated ammonia. The combined stream is recycled through line 60 to line 17. Approximately 77 pounds per hour of anhydrous ammonia are introduced into line 17 through line 63 to compensate for losses together with 6,977 pounds per hour of anhydrous ammonia from the water-ammonia distillation discussed below.

Approximately 1,220.67 mols per hour of gas is withdrawn from absorber 15 through line 65, heated to a temperature of 65° F. in heat exchanger 66 and introduced into the ammonia absorption zone. This ammonia absorption zone operates in a manner similar to the previously described zone except that fresh water is not employed. Thus, the unabsorbed gases containing entrained ammonia are passed from line 65 to a first liquid phase absorption stage 67 where a portion of the entrained ammonia is dissolved in water containing dissolved ammonia entering absorber 67 through line 68. Water containing all of the entrained ammonia introduced through line 65 is withdrawn from line 69. Evolved heat is removed from the first absorption section by indirect heat exchange with cooling liquid, i.e., water, introduced through line 70 and withdrawn from line 71. Unabsorbed gases containing a reduced quantity of ammonia are withdrawn from zone 67 through line 79 and are introduced into a second liquid phase absorption stage 72 wherein they are contacted with water containing ammonia introduced through line 73. Evolved heat is removed by indirect heat exchange with internally circulating cooling water flowing through line 74. Uncondensed gases containing a further reduced quantity of ammonia are withdrawn from second liquid phase absorption stage 72 and introduced into scrubber 76 through line 75. The gases entering scrubber 76 are countercurrently contacted with approximately 19,740 pounds per hour of recycle water introduced to the top of scrubber 76 through line 77. A gas substantially free of ammonia is withdrawn from the top of scrubber 76 and removed from the system. This gas has the following composition.

Table II

| | Mols per hour |
|---|---|
| $H_2$ | 378.1 |
| CO | 367.4 |
| $N_2$+A | 12.0 |
| $CH_4$ | 109.8 |
| $C_2H_2$ | 1.25 |
| $C_2H_4$ | 129.05 |
| $C_2H_6^+$ | 8.07 |
| $NH_3$ | 1.01 |
| $H_2O$ | 17.90 |
| Total | 1,024.58 |

Water containing dissolved ammonia is withdrawn from line 69 and combined with the water-ammonia stream flowing in line 55. The combined streams flow through line 78 to a distillation tower, not shown, where the ammonia is separated from the ammonia-water by distillation at a bottoms temperature of 390° F. and a pressure of 220 p.s.i.a. and a top temperature of 118° F. and a pressure of 217 p.s.i.a. 6,977 pounds per hour of anhydrous ammonia are recovered by fractional distillation and are introduced into line 17 through line 63. 29,100 pounds per hour of water containing traces of ammonia, are recovered and recycled through line 80 for use in the ammonia absorption zone.

Various modifications and alterations of the process of this invention will be apparent to those skilled in the art and may be used without departing from the scope of the invention.

We claim:
1. In a process for separating acetylene from a gas mixture obtained by the pyrolysis of light hydrocarbons and containing acetylene, other normally gaseous hydrocarbons, carbon oxides and hydrogen by absorption of the acetylene in liquid ammonia in an absorption zone, the improvement which comprises: admixing ammonia vapor with said gas mixture, cooling the resulting admixture and introducing said cooled admixture into said absorption zone.

2. In a process for separating acetylene from a gas mixture obtained by the pyrolysis of light hydrocarbons and containing acetylene, other normally gaseous hydrocarbons, carbon oxides and hydrogen by absorption of the acetylene in liquid ammonia in an absorption zone, the improvement which comprises: admixing ammonia vapor with said gas mixture in an amount between about 0.1 and about 0.06 mol per mol of said gas mixture, cooling the resulting admixture to a temperature between about 32° F. and about −60° F. and introducing said cooled admixture into said absorption zone.

3. In a process for separating acetylene from a gas mixture obtained by the pyrolysis of light hydrocarbons and containing acetylene, other normally gaseous hydrocarbons, carbon oxides and hydrogen by absorption of the acetylene in liquid ammonia in an absorption zone, the improvement which comprises: admixing ammonia vapor with said gas mixture in an amount between about 0.01 and about 0.06 mol of ammonia vapor per mol of said gas mixture, and cooling said admixture to a temperature between about 32° F. and about −60° F., withdrawing condensed material from the process and introducing said cooled admixture into said absorption zone maintained at a temperature between about −95° F. and 0° F.

4. The process of claim 3 in which the gas-ammonia vapor admixture is cooled to a temperature between about 10° F. and about 30° F. above the temperature maintained in the absorption zone.

5. In a process for separating acetylene from a gas mixture obtained by the pyrolysis of light hydrocarbons and containing acetylene, other normally gaseous hydrocarbons, carbon oxides and hydrogen by absorption of acetylene and a minor amount of said other gases in liquid ammonia in an absorption zone from which a bottoms comprising said ammonia absorbent rich in acetylene and containing a minor amount of said other gases is withdrawn and treated in a stripping zone to remove an overhead stream comprising said other gases, a minor amount of acetylene and ammonia vapor, the improvement which comprises: admixing said gas mixture containing acetylene with said overhead stream containing ammonia vapor, cooling the resulting admixture and introducing said cooled admixture into said absorption zone.

6. In a process for separating acetylene from a gas mixture obtained by the pyrolysis of light hydrocarbons and containing acetylene, other normally gaseous hydrocarbons, carbon oxides and hydrogen by absorption in liquid ammonia in an absorption zone from which a bottoms comprising said ammonia absorbent rich in acetylene and containing a minor amount of said other gases is withdrawn and treated in a stripping zone to remove an overhead stream comprising said other gases, a minor amount of acetylene and ammonia vapor, the improvement which comprises: admixing said gas mixture containing acetylene with said overhead stream containing ammonia vapor, cooling said admixture to a temperature between about 32° F. and about −60° F. and introducing said cooled admixture into said absorption zone maintained at a temperature between about 0° F. and −95° F.

7. In a process for separating acetylene from a gas mixture obtained by the pyrolysis of light hydrocarbons and containing acetylene, other normally gaseous hydrocarbon, carbon oxides and hydrogen by absorption in liquid ammonia in an absorption zone from which a bottoms comprising said ammonia absorbent rich in acetylene and containing a minor amount of said other gases is withdrawn and treated in a stripping zone to remove an overhead stream comprising said other gases, a minor amount of acetylene and ammonia vapor, the improvement which comprises: admixing said gas mixture containing acetylene with said overhead stream containing ammonia vapor in an amount sufficient to provide between 0.01 and about 0.06 mol of ammonia per mol of said gas mixture, cooling said admixture to a temperature between about 32° F. and about −60° F., withdrawing condensed material from the process and introducing said cooled admixture into said absorption zone maintained at a temperature between about 0° F. and about −95° F.

8. In a process for separating acetylene from a gas mixture obtained by the pyrolysis of light hydrocarbons and containing acetylene, other normally gaseous hydrocarbons, carbon oxides and hydrogen by absorption of acetylene and a minor amount of said other gases in liquid ammonia in an absorption zone from which a bottoms comprising said ammonia absorbent rich in acetylene and containing a minor amount of said other gases is withdrawn and treated to remove a stream containing absorbed non-acetylenic pyrolysis gases together with a minor amount of acetylene and ammonia vapor, the improvement which comprises admixing said gas mixture containing acetylene with said removed stream containing ammonia vapor, cooling the resulting admixture and introducing said cooled admixture into said absorption zone.

References Cited in the file of this patent

UNITED STATES PATENTS

| | | |
|---|---|---|
| 2,690,814 | Reid | Oct. 5, 1954 |
| 2,788,378 | Cotton | Apr. 9, 1957 |
| 2,812,830 | Sattler | Nov. 12, 1957 |
| 2,856,258 | Braconier et al. | Oct. 14, 1958 |
| 2,894,602 | Fauser | July 14, 1959 |